US012586953B2

(12) United States Patent
Gould et al.

(10) Patent No.: US 12,586,953 B2
(45) Date of Patent: Mar. 24, 2026

(54) ELECTRICAL CONNECTOR

(71) Applicant: GOLDRAY ELECTRIC PTY LTD, Raworth (AU)

(72) Inventors: Adam Gould, Cleveland (AU); Christopher Rafferty, Raworth (AU)

(73) Assignee: GOLDRAY ELECTRIC PTY LTD, Raworth (AU)

( * ) Notice: Subject to any disclaimer, the term of this patent is extended or adjusted under 35 U.S.C. 154(b) by 147 days.

(21) Appl. No.: 18/035,410

(22) PCT Filed: Nov. 4, 2021

(86) PCT No.: PCT/AU2021/051295
§ 371 (c)(1),
(2) Date: May 4, 2023

(87) PCT Pub. No.: WO2022/094657
PCT Pub. Date: May 12, 2022

(65) Prior Publication Data

US 2024/0006811 A1 Jan. 4, 2024

(30) Foreign Application Priority Data

Nov. 6, 2020 (AU) ................................ 2020904061

(51) Int. Cl.
*H01R 13/627* (2006.01)
*H01R 13/58* (2006.01)
*H01R 4/48* (2006.01)

(52) U.S. Cl.
CPC ..... *H01R 13/6276* (2013.01); *H01R 13/5816* (2013.01); *H01R 4/48* (2013.01)

(58) Field of Classification Search
CPC ...... H01R 13/627; H01R 13/74; H01R 13/58; H01R 13/639; H01R 27/02; H01R 13/625; H01M 2220/20; H01M 2220/30
(Continued)

(56) References Cited

U.S. PATENT DOCUMENTS 3,611,255 A 10/1971 Shroyer
4,206,961 A 6/1980 Cifalde
(Continued)

FOREIGN PATENT DOCUMENTS

DE 102018109411 A1 10/2019
FR 811155 A 4/1937
(Continued)

OTHER PUBLICATIONS

Extended European Search Report for EP Application No. 21887904.7 dated Dec. 20, 2024.
(Continued)

*Primary Examiner* — Tulsidas C Patel
*Assistant Examiner* — Carlos E Lopez-Pagan
(74) *Attorney, Agent, or Firm* — Meunier Carlin & Curfman LLC

(57) ABSTRACT

An electrical connector comprises a plug connector and a socket connector connectable to respective electrical conduits, wherein the plug connector and at least partly prevent or minimize rotational and/or longitudinal movement of the electrical conduits relative to the connectors. The socket connector may comprise a rotatable retainer comprising one or more flange members and the plug connector may comprise one or more complementary flange members, so that rotation of the retainer facilitates engagement between the respective flange members of the socket connector and the plug connector. Power sources are also provided which comprise the hereinbefore described rotatable retainer and flange elements.

1 Claim, 11 Drawing Sheets

(58) Field of Classification Search
USPC .......................................................... 439/312
See application file for complete search history.

(56) References Cited

U.S. PATENT DOCUMENTS

| | | | | |
|---|---|---|---|---|
| 5,344,333 | A | 9/1994 | Haag | |
| 6,358,076 | B1 * | 3/2002 | Haag .................. | H01R 13/6395 439/373 |
| 6,454,576 | B1 * | 9/2002 | Hedrick ............. | H01R 13/5812 439/369 |
| 2002/0182905 | A1 | 12/2002 | Hedrick et al. | |
| 2008/0132122 | A1 | 6/2008 | Brekosky et al. | |
| 2010/0081321 | A1 | 4/2010 | Malloy et al. | |
| 2011/0021057 | A1 | 1/2011 | Katagiyama et al. | |
| 2012/0276762 | A1 * | 11/2012 | Hohner .............. | H01R 13/5804 439/98 |
| 2018/0054082 | A1 * | 2/2018 | Mendenhall ............ | H02S 10/40 |
| 2021/0167546 | A1 | 6/2021 | Schüssler et al. | |

FOREIGN PATENT DOCUMENTS

| | | | | |
|---|---|---|---|---|
| WO | WO-2018206071 | A1 * | 11/2018 | ............. H01R 13/05 |
| WO | 2019104010 | A1 | 5/2019 | |

OTHER PUBLICATIONS

Notification of Transmittal of International Preliminary Report on Patentability (Chapter II of the Patent Cooperation Treaty) issued in PCT/AU2021/051295, mailed Feb. 15, 2023.
International Search Report and Written Opinion for PCT/AU2021/051295, mailed Nov. 29, 2021.

* cited by examiner

ELECTRICAL CONNECTOR

CROSS REFERENCE TO RELATED APPLICATIONS

This application is a national stage application filed under 35 U.S.C. § 371 of PCT/AU2021/051295 filed Nov. 4, 2021, which claims priority to and benefit of Australian application serial number 2020904061 filed Nov. 6, 2020.

TECHNICAL FIELD

THIS INVENTION relates to electrical connectors. More particularly, this invention relates to electrical connectors that provide a safe and secure electrical connection between electrical cables.

BACKGROUND

There are numerous devices available for connecting two power leads or extension leads using a male plug and female socket or to connect a power tool or appliance to an extension lead, that do not always provide a safe and secure connection. Failures of such connection devices can subject users to serious injury and unsafe work practices.

Accidental uncoupling of such connections can cause injury to an operator if the uncoupling of the connection happens during a critical point of an operation such as drilling, grinding, welding or other tradesman activities. The sudden loss of power whilst operating a power tool can cause injury by many means, especially when the operator is working at height. For instance, when drilling, a loss of power and the subsequent restart under load, creates a sudden jerk of the power tool that will cause an operator to become unbalanced and fall, including falling from height.

In addition to potentially injuring the operator, the loss of power and the need to stop work and if at height, to come down from an elevated work platform to reconnect the broken power supply results in a loss of work time at a cost to business. There is a need for an improved connector that provides an operator with confidence that the connection will not become unsafe or become uncoupled while undertaking a task with a power tool or appliance.

Numerous methods of securing an electrical connection exist. U.S. Pat. No. 5,344,333 uses a threaded connection of the male plug to the female socket where the external sleeve must be aligned and rotated to engage and tighten the threaded engagement features. U.S. Pat. No. 3,611,255 describes a multiple barbed locking device which would take additional effort to uncouple. U.S. Pat. No. 4,206,961 describes an external coiled rod to maintain the connection of the male plug to the female socket but the external device would take additional time to assemble and be prone to snagging on obstacles. U.S. Pat. No. 6,454,576 describes a rotating sleeve that engages lugs to lock the connection requiring fitting a housing and a special socket to make the connection, increasing the cost and requiring additional steps to complete the connection. There are many clip-on devices designed to capture the male plug and female socket but these are cumbersome and bulky and are prone to snag on obstacles especially in a construction site. When connections snag and the electrical cord is tugged, damage can be caused to the connection and connections can uncouple.

SUMMARY

The present invention is broadly directed to an electrical connector for safely securing one or more electrical conduits, such as double insulated electrical cables. The electrical connector may be in a form that comprises a plug and/or a socket. When connected, the electrical connector provides a safe and secure electrical connection to improve safety when working with electrical equipment such as electric power tools and appliances, particularly on construction work sites but also in industrial, commercial, domestic, caravan parks, hospitals, laboratories, film making and music festival applications where power tools and extension leads are commonly used.

An aspect of the invention provides an electrical connector that is connectable to an electrical conduit, which electrical connector comprises a housing having an internal recess and a lock locatable inside the housing for engaging the internal recess and the conduit to thereby secure the electrical conduit to the electrical connector.

Suitably, the lock can engage the housing and the electrical conduit to secure or at least partly prevent or minimize rotational and/or longitudinal movement of the electrical conduit relative to the electrical connector.

In one embodiment, the lock comprises a body. In a particular embodiment, the body comprises two or more portions that are moveable between an open configuration and a closed, clamping configuration to thereby facilitate clamping engagement of the conduit. In a particular embodiment, the body is a substantially spherical body. In a particular embodiment, the lock is, or comprises, a locking ball.

Suitably, the two or more body portions comprise one or more snap fit connectors that facilitate maintaining the closed, clamping configuration.

Suitably, engagement between the housing and lock provide an Ingress Protection (IP) Rating. In a particular embodiment, engagement occurs between a groove in the internal recess of the housing and a bump on the body of the lock.

In one embodiment, the electrical connector is a plug connector that comprises a plug member.

According to this embodiment, the plug connector comprises one or more conductors electrically connectable to wires of the conduit. Suitably, the plug connector comprises a spring steel clamp to facilitate electrically connecting the conductor(s) to the wires of the conduit In an alternative embodiment, the electrical connector is a socket connector that comprises a socket.

In yet another embodiment, the electrical connector further comprises a locking member that can releasably lock the electrical connector to another electrical connector that comprises a complementary locking member. In a particular embodiment, the locking member and the complementary locking member comprise one or more respective, complementary flange elements.

Suitably, the electrical connector further comprises a rotatable retainer that comprises the one or more flange elements, arranged so that rotation of the retainer facilitates alignment and engagement between the locking members of the electrical connector and the complementary locking members of another electrical connector to form a lockable electrical connection between the electrical connector and said another electrical connector.

Preferably, the socket connector comprises the rotatable retainer.

An embodiment of this aspect limits the rotary movement of the rotatable retainer so that it is in an "open" or "unlocked" position when not connected to the socket connector and thereby allow rapid connection of the plug connector to the socket connector.

Suitably, the rotatable retainer is in an open position when disconnected from the plug to thereby facilitate rapid connection to the plug.

Suitably, the rotatable retainer is rotatable by about 60 degrees to thereby facilitate rapid connection to the plug.

Another aspect of the invention provides an electrical connector comprising a plug connector and a socket connector, wherein the socket connector comprises a rotatable retainer comprising one or more locking members and the plug connector comprises one or more complementary locking members, arranged so that rotation of the retainer facilitates engagement between the locking members of the socket connector and the complementary locking members of the plug connector to form a lockable electrical connection between the plug connector and the socket connector.

Preferably, the locking members and the complementary locking members comprise one or more respective, complementary flange elements.

An embodiment of this aspect limits the rotary movement of the rotatable retainer so that it is in an "open" or "unlocked" position when not connected to the socket connector and thereby allow rapid connection of the plug connector to the socket connector.

Suitably, the rotatable retainer is in an open position when disconnected from the plug to thereby facilitate rapid connection to the plug.

Suitably, the rotatable retainer is rotatable by about 60 degrees to thereby facilitate rapid connection to the plug.

Preferably, the one or more locking members of the socket connector comprise one or more O-rings.

Suitably, the lockable electrical connection between the plug connector and the socket connector provides an IP rating.

In a particular embodiment, the plug connector and the socket connector are according to the first-mentioned aspect.

A further aspect of the invention provides an electrical connector comprising a first connector and a second connector that are connectable to respective electrical conduits, wherein the first connector comprises a housing having an internal recess and a lock locatable inside the electrical connector for engaging the internal recess and the conduit to thereby secure one of the electrical conduits to the electrical connector and the second connector comprises a housing having an internal recess and a lock locatable inside the housing for engaging the internal recess and the conduit to thereby secure another of the electrical conduits to the electrical connector, wherein the first connector and the second connector are connectable to each other to form an electrical connection between the plug connector and the socket connector.

Suitably, the plug and the socket connectors further comprise one or more respective locking members that can releasably lock the plug connector to the socket connector. Preferably, the locking member of the socket comprises a rotatable retainer. Preferably, the retainer and the plug connector respectively comprise complementary flange elements, arranged so that rotation of the retainer facilitates engagement between the complementary flange members to thereby form a lockable electrical connection between the plug connector and the socket connector.

A yet further aspect of the invention provides a power source comprising one or more socket connectors respectively connectable to a plug connector that comprises a housing having an internal recess and a lock located inside the electrical connector for engaging the internal recess and that secures an electrical conduit to the plug connector, the plug connector and the socket connectors comprising one or more respective, complementary flange elements that form a lockable electrical connection between the plug connector and the socket connectors of the power source.

In an embodiment, the socket connector(s) comprises a rotatable retainer comprising the one or more flange elements of the socket connector, arranged so that rotation of the retainer facilitates engagement between the complementary flange elements to form a lockable electrical connection between the plug connector and the power source.

The power source may further comprise a plug connector for receiving power from a socket connector of an electrical conduit electrically connectable to a power supply, the plug connector of the power source and the socket connector of the electrical conduit comprising one or more respective, complementary flange elements that form a lockable electrical connection between the power outlet plug connector and the socket connector of the electrical conduit connectable to the power supply.

A still further aspect provides a power source comprising a plug connector for receiving power from a socket connector of an electrical conduit electrically connectable to a power supply, the plug connector of the power source and the socket connector of the electrical conduit comprising one or more respective, complementary flange elements that form a lockable electrical connection between the power outlet plug connector and the socket connector of the electrical conduit connectable to the power supply.

The power source may further comprise one or more power source socket connectors connectable to a plug connector of an electrical conduit that comprises a housing having an internal recess and a lock located inside the plug connector for engaging the internal recess and that secures the electrical conduit to the plug connector, the plug connector of the electrical conduit and the power source socket connectors comprising one or more respective, complementary flange elements that form a lockable electrical connection between the plug connector of the electrical conduit and the socket connector of the power source.

In an embodiment of this aspect, the power source socket connectors comprise respective rotatable retainers comprising the one or more flange elements of the power source socket connector, arranged so that rotation of the retainer facilitates engagement between the complementary flange elements to form a lockable electrical connection between the plug connector of the electrical conduit and the socket connectors of the power source.

Suitably, the socket connector of the electrical conduit comprises a rotatable retainer comprising the one or more flange elements, arranged so that rotation of the retainer facilitates engagement between the complementary flange elements to form a lockable electrical connection between the socket connector of the electrical conduit and the plug connector of the power source.

The socket connector of the electrical conduit preferably comprises a housing having an internal recess and a lock locatable inside the electrical connector for engaging the internal recess and the conduit to thereby secure the electrical conduit to the plug connector of the power source.

According to the aforementioned aspects, the plug connector of the power source is located in a recessed housing.

According to the aforementioned aspects, the power source comprises a plurality of socket connectors.

Typically, the or each conduit of the aforementioned aspects is an electrical cable such as a double-insulated cable.

Throughout this specification, unless otherwise indicated, "comprise", "comprises" and "comprising" are used inclusively rather than exclusively, so that a stated integer or group of integers may include one or more other non-stated integers or groups of integers.

It will also be appreciated that the indefinite articles "a" and "an" are not to be read as singular indefinite articles or as otherwise excluding more than one or more than a single subject to which the indefinite article refers. For example, "a" conductor includes one conductor, one or more conductors or a plurality of conductors.

Unless explicitly stated or otherwise evident from the context, terms such as "connected", "connectable", "locked", "lockable", "engaged" and "engageable" include and encompass releasable engagement, locking and/or connection.

BRIEF DESCRIPTION OF THE FIGURES

Non-limiting embodiments of the invention are described with reference to the figures, wherein.

DETAILED DESCRIPTION

Figure 1A:
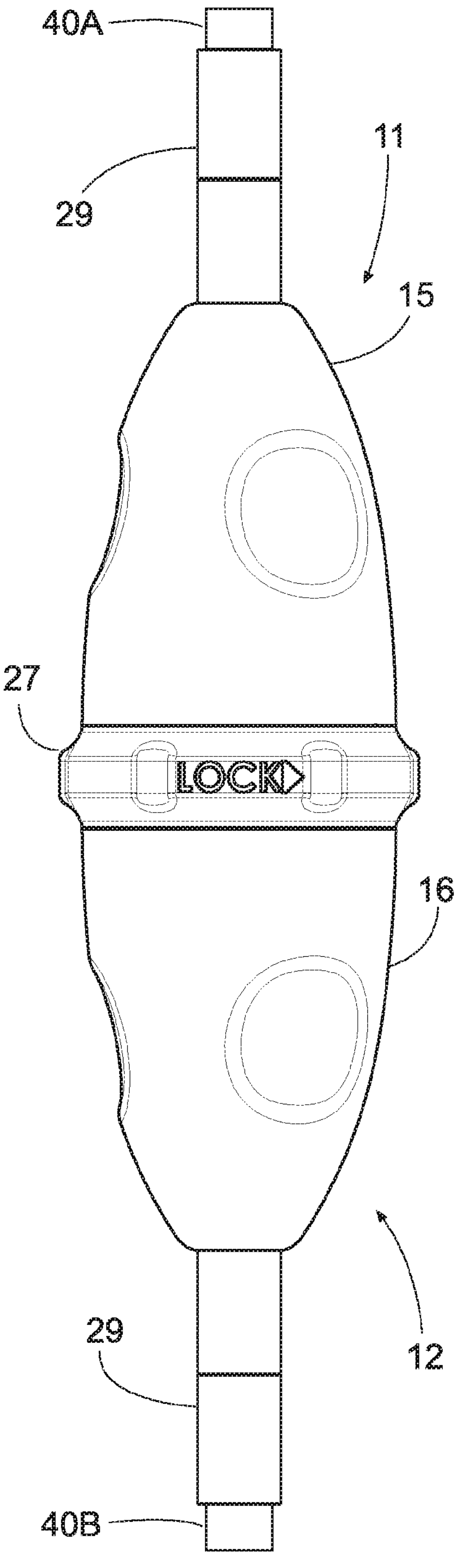
FIG. 1A is a perspective view of a connector with grommets having a smooth external shape according to a first embodiment of the invention.
Figure 1B:
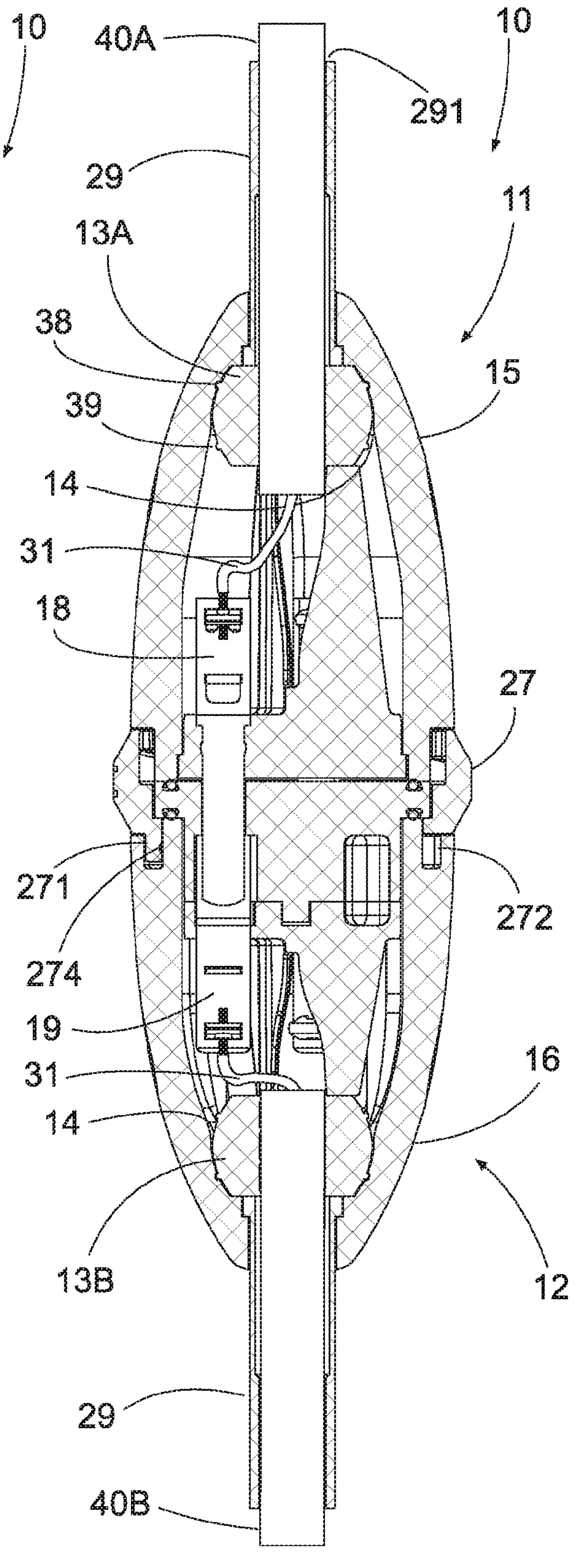
FIG. 1B is a sectional view of the male plug housing, the female socket housing, the retaining ring and the grommets of the connector according to a first embodiment of the invention.
Figure 2A:
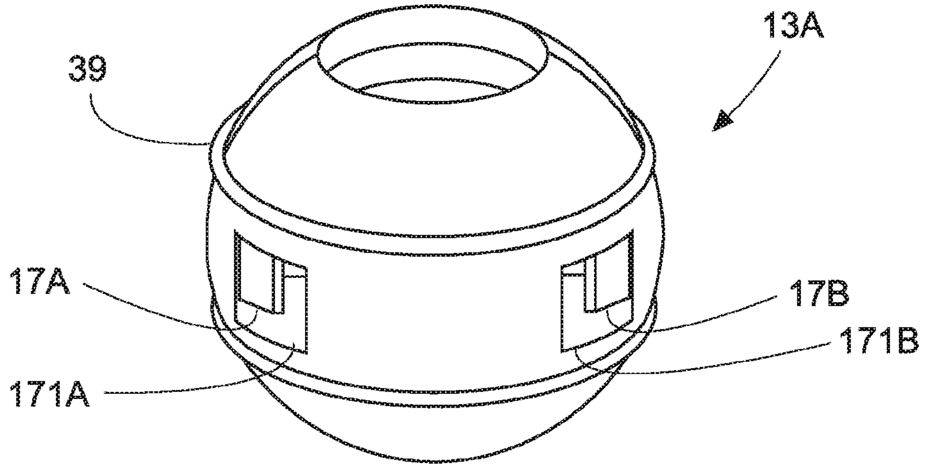
FIG. 2A is a perspective view of a locking ball.
Figure 2B:
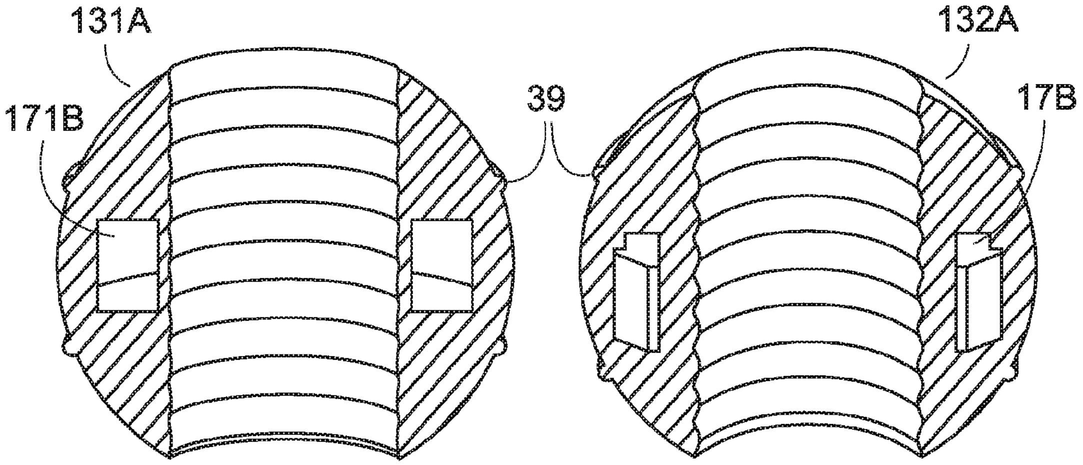
FIG. 2B is a sectional view of a locking ball.
Figure 2C:
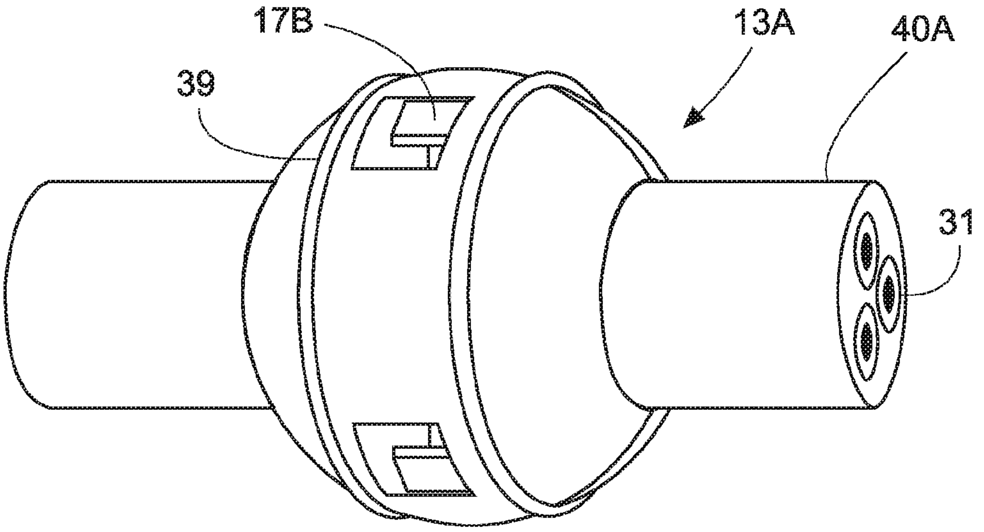
FIG. 2C is a perspective view of a locking ball clamped over an electric cable.
Figure 3A:
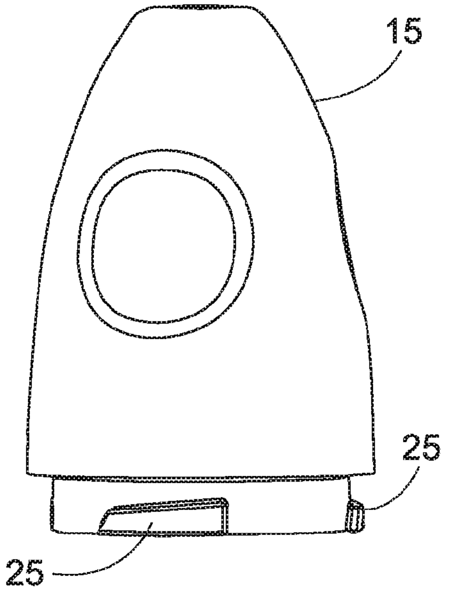
FIG. 3A is a perspective view of a male plug with flange segments.
Figure 3B:
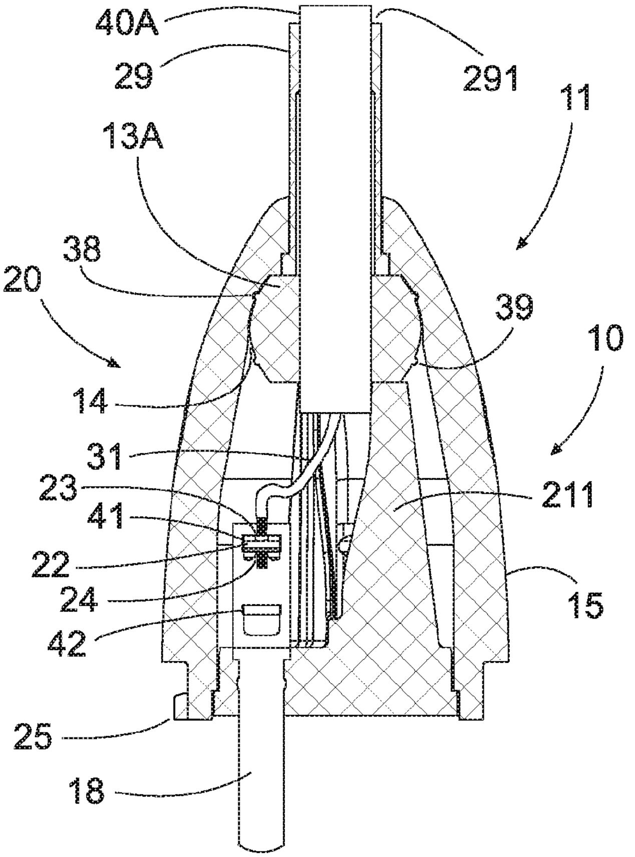
FIG. 3B is a sectional view of a male plug with locking ball, conductors, cable and wires.
Figure 3C:
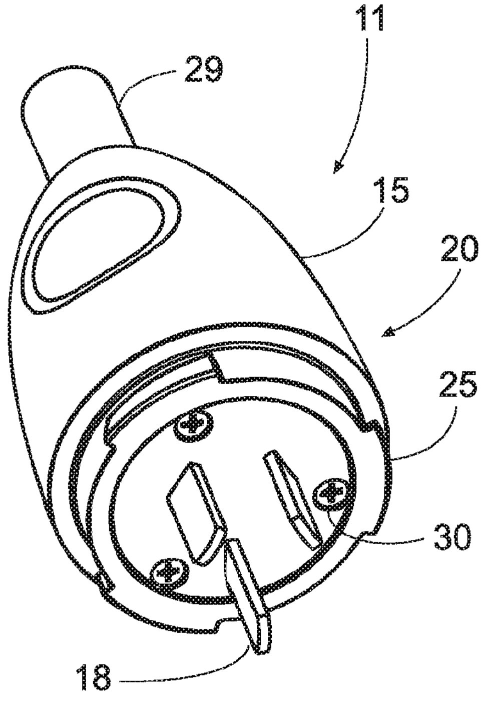
FIG. 3C is a perspective view of a male plug with conductors and flange segments.
Figure 3D:
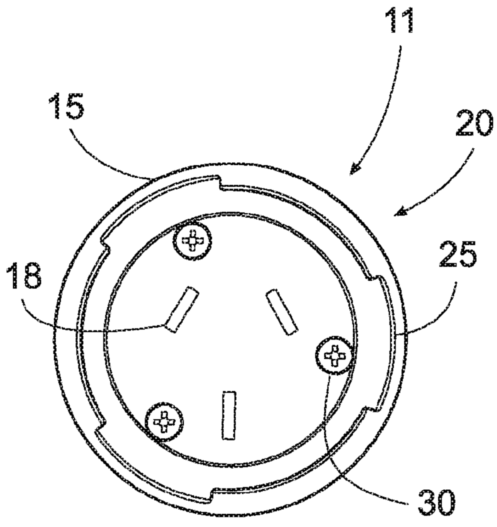
FIG. 3D is an end view of a male plug with flange segments and conductors.
Figure 4A:
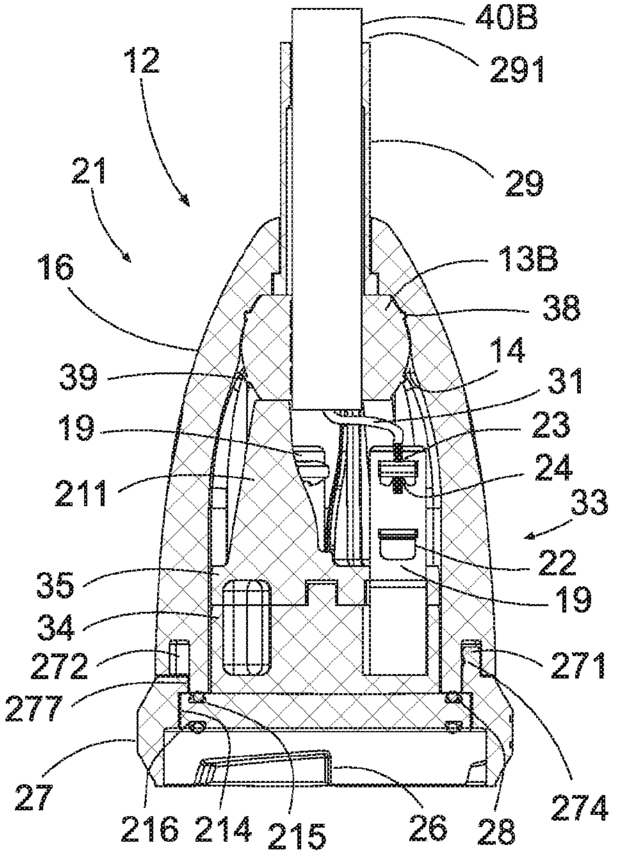
FIG. 4A is a sectional view of a female socket with locking ball, conductors and retaining ring.
Figure 4B:
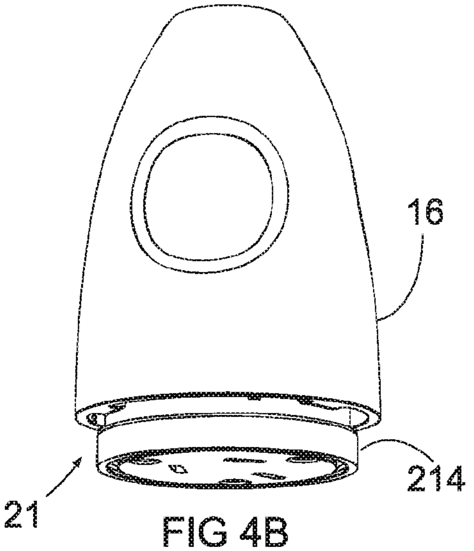
FIG. 4B is a perspective view of a female socket with conductor assembly.
Figure 4C:
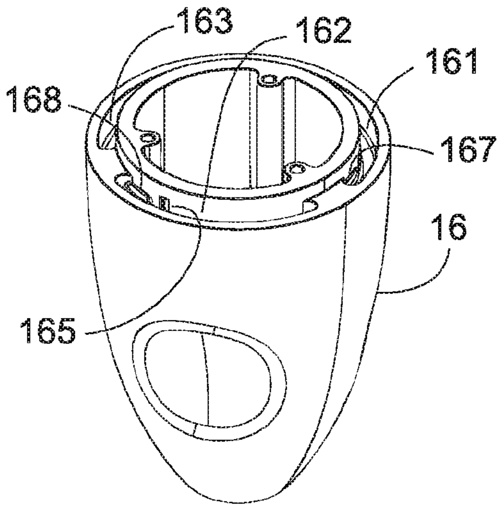
FIG. 4C is a perspective end view of a female socket with guide slots.
Figure 4D:
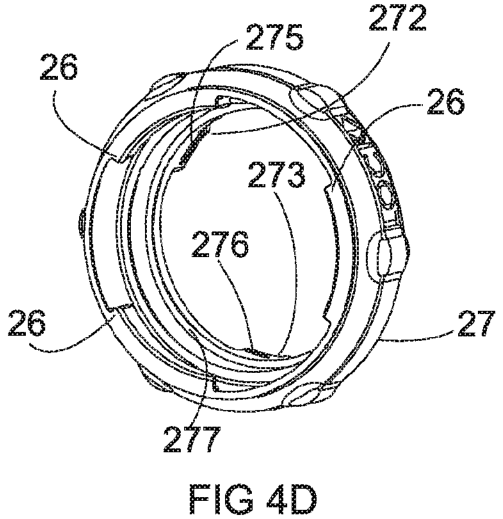
FIG. 4D is a perspective view of a retaining ring with flange segments.
Figure 4E:
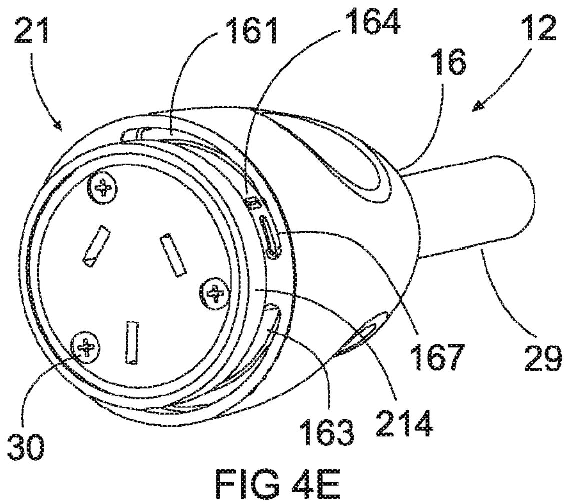
FIG. 4E is a perspective view of a female socket with conductor assembly.
Figure 5A:
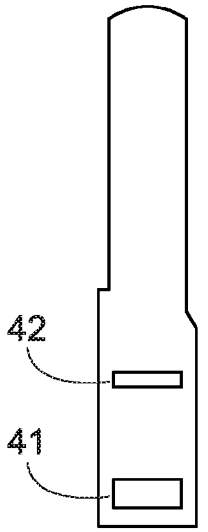
FIG. 5A is a front view of a male conductor for a male plug.
Figure 5B:
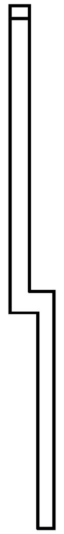
FIG. 5B is a side view of a male conductor for a male plug.
Figure 5C:
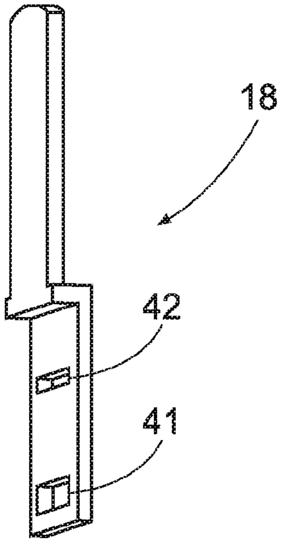
FIG. 5C is a perspective view of a male conductor for a male plug.
Figure 5D:
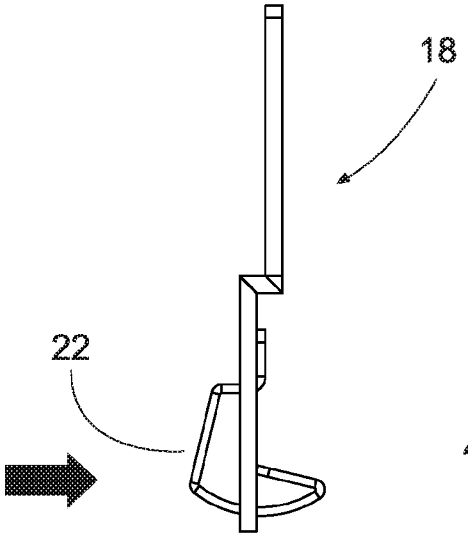
FIG. 5D is a side view of a male conductor with spring steel clamp for a male plug.
Figure 5E:
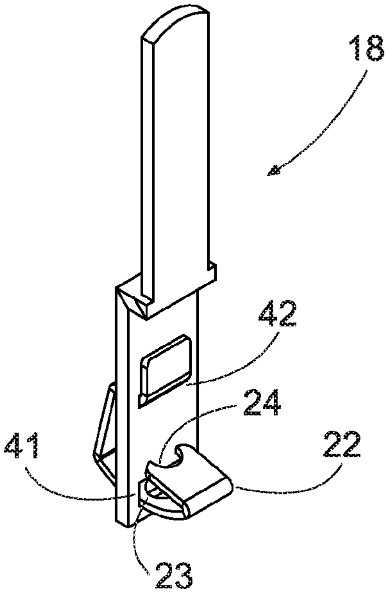
FIG. 5E is a perspective view of a male conductor with spring steel clamp for a male plug.
Figure 6A:
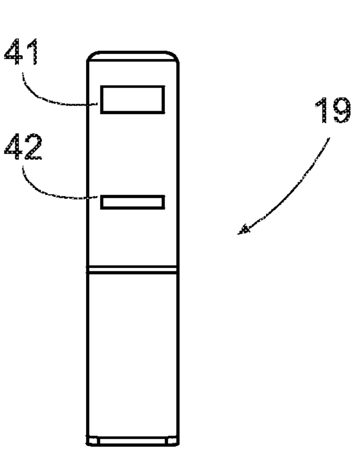
FIG. 6A is a front view of a female conductor for a female socket.
Figure 6B:
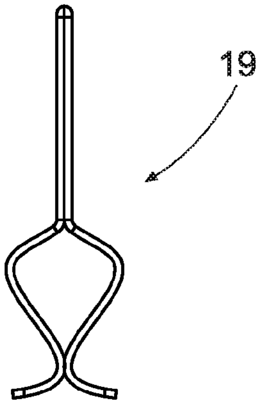
FIG. 6B is a side view of a female conductor for a female socket.
Figure 6C:
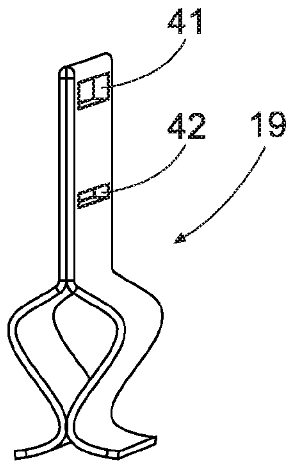
FIG. 6C is a perspective view of a female conductor for a female socket.
Figure 6D:
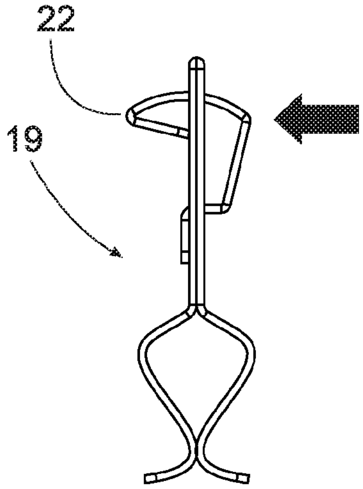
FIG. 6D is a side view of a female conductor with spring steel clamp for a female socket.
Figure 6E:
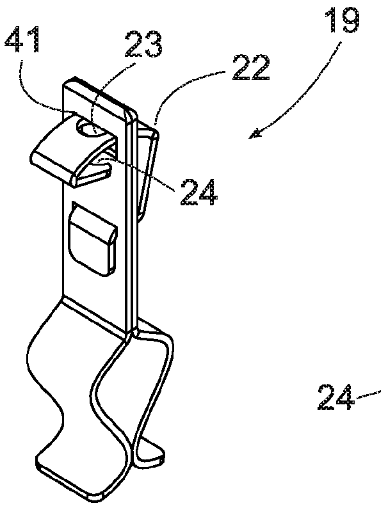
FIG. 6E is a perspective view of a female conductor with spring steel clamp for a female socket.
Figure 6F:
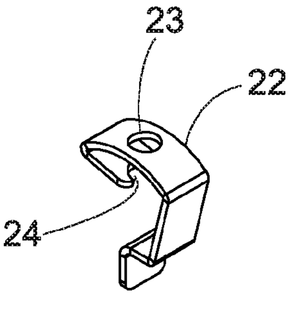
FIG. 6F is a perspective view of a spring steel clamp.
Figure 7A:
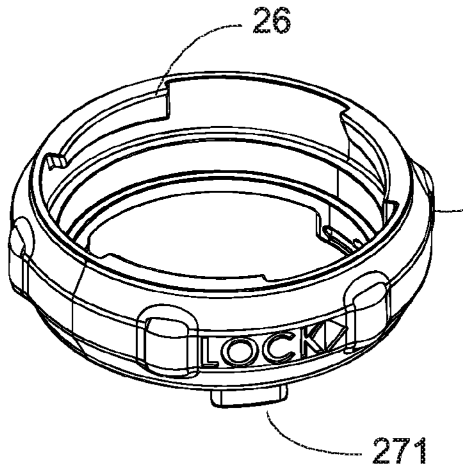
FIG. 7A is a perspective view from the top of a retaining ring.
Figure 7B:
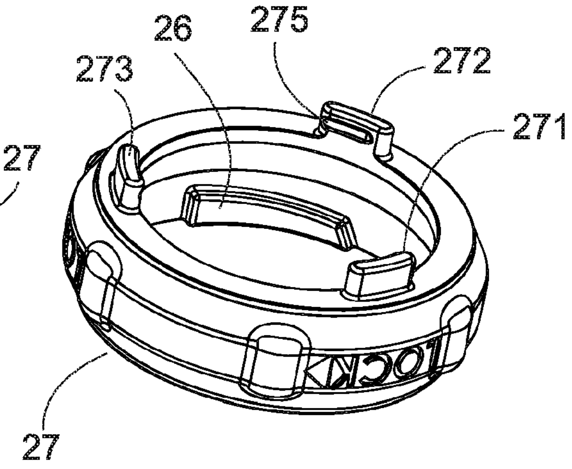
FIG. 7B is a perspective view from the underside of a retaining ring.
Figure 7C:
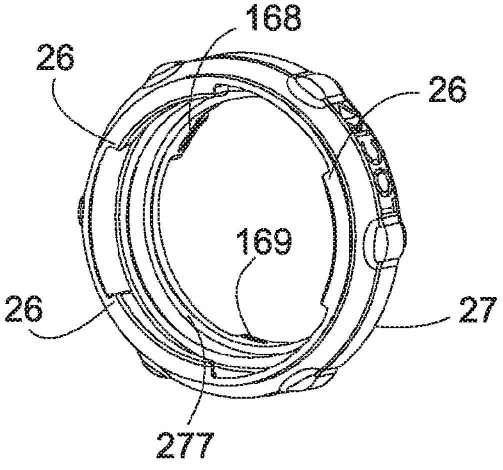
FIG. 7C is a perspective view of a retaining ring.
Figure 7D:
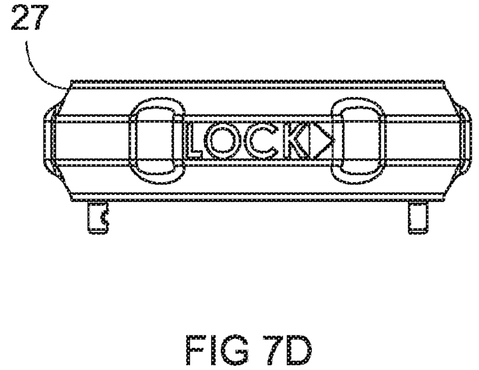
FIG. 7D is a side view of a retaining ring with lugs.
Figure 7E:
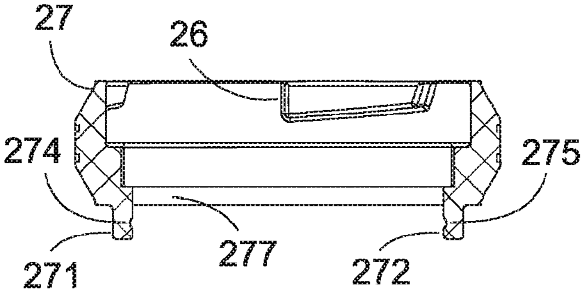
FIG. 7E is a sectional view of a retaining ring.
Figure 8:
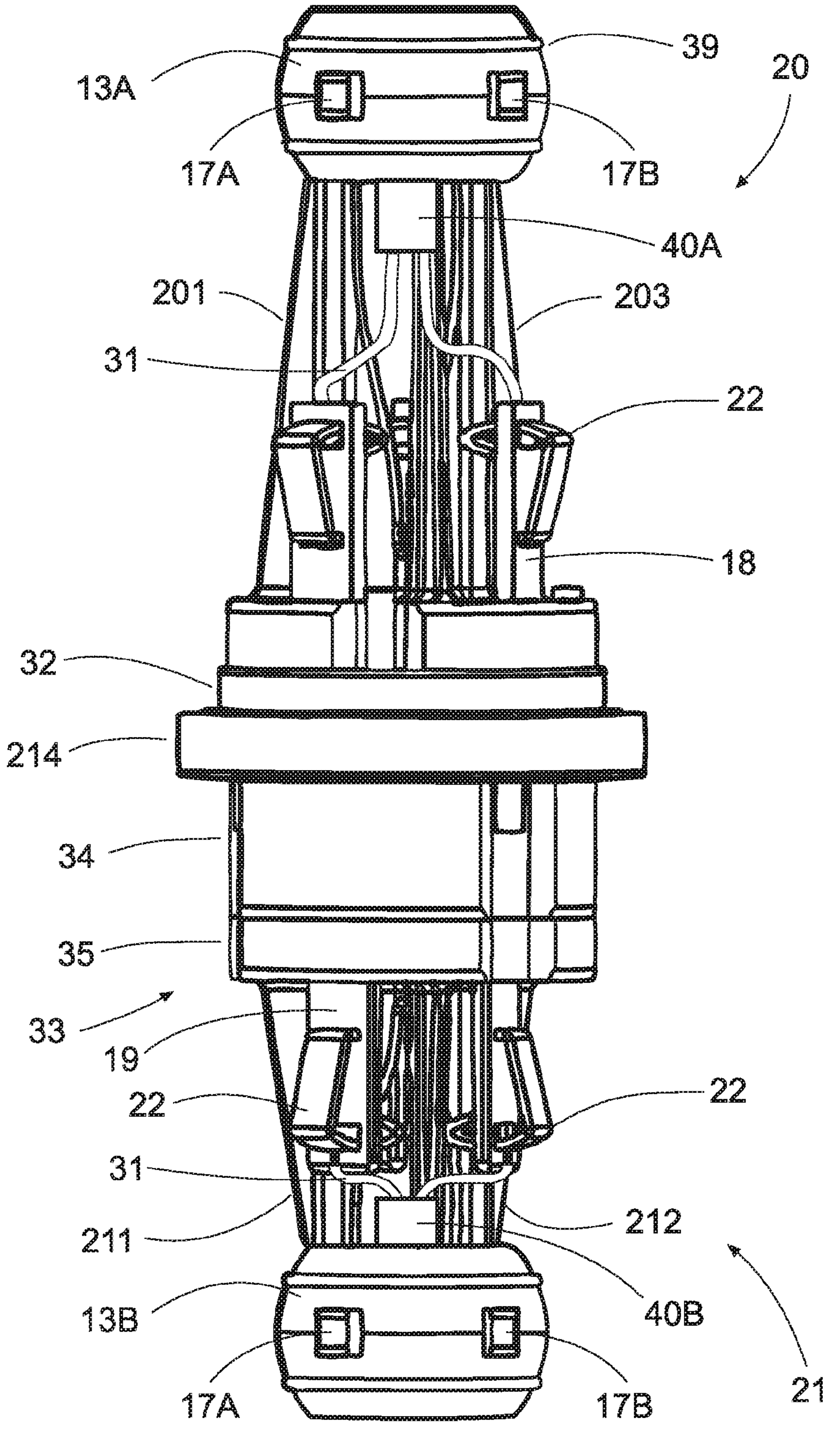
FIG. 8 is a sectional view of a male plug conductor assembly and female socket conductor assembly with locking balls.
Figure 9A:
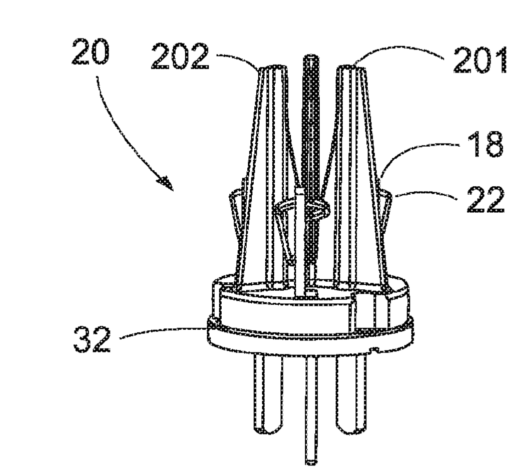
FIG. 9A is a perspective view of a male plug mounting body with isolating blades, conductors and spring steel clamps.
Figure 9B:
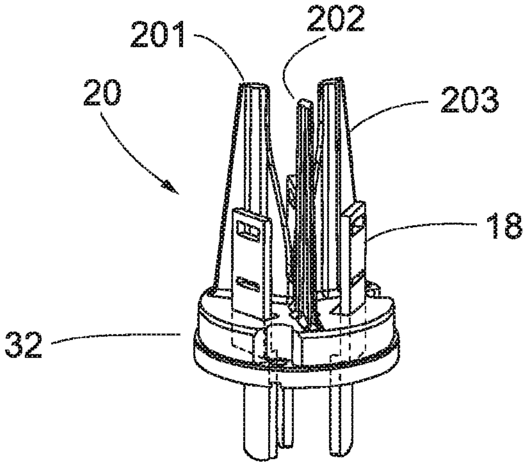
FIG. 9B is a perspective view of a male plug mounting body with isolating blades and conductors.
Figure 9C:
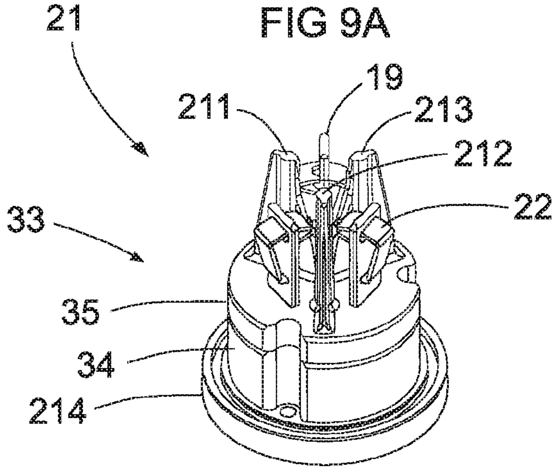
FIG. 9C is a perspective view of a female socket mounting body with isolating blades, conductors and spring clips.
Figure 9D:
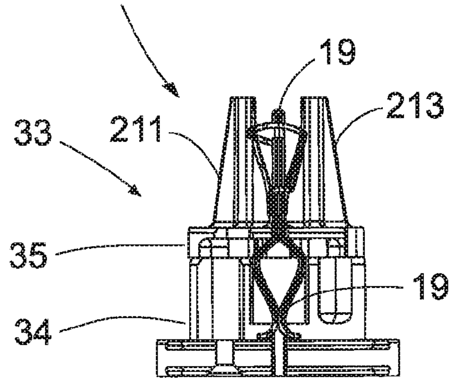
FIG. 9D is a sectional view of a female socket mounting body with isolating blades, conductors and spring clips.
Figure 9E:
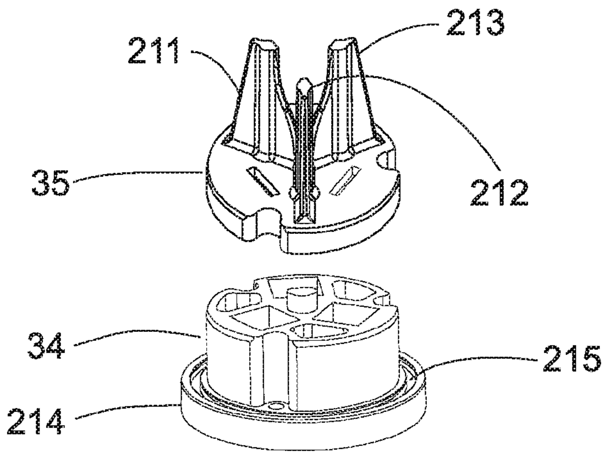
FIG. 9E is a perspective view of a female socket mounting body base and mounting body cover with isolating blades.
Figure 9F:
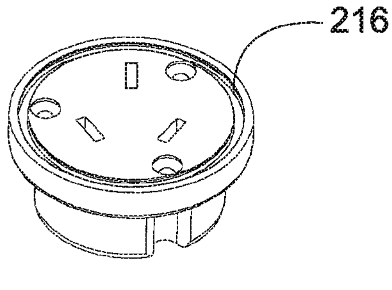
FIG. 9F is a perspective view of a female socket mounting body base.

As shown in FIGS. 1 and 2, electrical connector 10 secures the double insulated cable 40 to male plug 11 and female socket 12 by way of locking ball 13A located in locking ball recess 14 in the male plug housing 15 and locking ball 13B located in female socket housing 16. Locking ball 13A comprises body portions 131A,132A which can have an open configuration and locking ball 13B (not shown in FIG. 2) comprises body portions 131B and 132B, which can have an open configuration, whereby the locking balls 13A,B are placed over respective double insulated cables 40A and 40B. The body portions 131A, 132A and 131B, 132B are then pressed into a closed, clamping configuration and locked together using snap fit connectors 17A, B and receiving slots 171A, 171B to provide a secure clamp around the double insulated cables 40A,B thereby preventing the cables 40A, B from moving within or pulling out of the locking balls 13A,B (e.g. by preventing rotational or longitudinal movement of the cables 40A, B relative to the locking balls 13A,B). The locking ball 13A is then captured in the locking ball recess 14 of male plug housing 15 and locking ball 13B is captured in the locking ball recess 14 of female socket housing 16, respectively preventing the double insulated cables 40A, B from being pulled out of the male plug 11 or female socket 12 and preventing any exposure of the single insulation wire 31 at the proximal end of the male plug 11 or female socket 12 that renders commonly used electrical plugs and sockets unsafe for use. Additionally, locking balls 13A, B absorb any tension exerted on double insulated cables 40A, B from external sources preventing tension from transferring to the connection of single core wire 31 to the spring steel clamps 22 in either or both of the male plug 11 and/or female plug 12. Double insulated cables 40 A, B are respectively shielded by grommets 29 to protect from damage due to flexing of the double insulated cables 40A, B against the proximal ends of the male plug 11 and female socket 12 of the electrical connector 10.

Referring to FIGS. 3 and 4, to assemble the male plug 11 and female socket 12 electrical connectors, the double insulated electrical cable 40A is passed through the proximal or cable end 291 of the grommet 29 of male plug housing 15 and double insulated electrical cable 40B is passed through the proximal or cable end 291 of the grommet 29 of female socket housing 16. The double insulated electrical cable 40A is then passed between body portions 131A, 132A of the locking ball 13A, and double insulated electrical cable 40B is then passed between body portions 131B, 132B of the locking ball 13B, leaving sufficient cable 40A, B to be able to connect and clamp the single insulated wires 31 of cable 40A by depressing the spring steel clamps 22 on the male conductors 18 of the male plug 11 and connect and clamp the single insulated wires 31 of cable 40B to female conductors 19 of the female socket 12. The locking ball body portions 131A, 132A and 131B, 132B are then pressed together to clamp tightly and lock onto the respective double insulated electrical cables 40A, B secured with the snap fit connectors 17A, B engaging respective receiving slots 171A, 171B (as shown in FIG. 2). The closed locking balls 13A,B are then respectively pushed into the locking ball recess 14 within the male plug housing 15 and female socket housing 16 preventing the double insulated electrical cables 40A, 40B from moving rotationally or longitudinally in relation to the male plug housing 15 and/or female socket housing 16.

The locking ball recess 14 of the male plug housing 15 and of the female socket housing 16 has locking ball recess groove 38 that engages locking ball bump 39 on the outside diameter of each of the locking balls 13A,B to provide an Ingress Protection (IP) Rating once the assembled locking ball 13A,B with captured double insulated cables 40A, B are assembled into the locking ball recess 14 of the male plug housing 15 or female socket housing 16. The captured locking balls 13A,B respectively prevent the double insulated electrical cables 40A, B from being pulled out of the proximal end of the male plug 11 and/or female socket 12 when load is applied to either of both of the double insulated cables 40A, B, such as when the double insulated cables 40A, B are pulled hard to clear a snag against an obstacle. As a result, the locking ball 13A,B prevents any transfer of the load or tension from pulling on the double insulated cables 40A, B being transferred to the single insulated wire 31 and its connection to male conductor 18, female conductor 19 and spring steel clamp 22.

The single insulated wires 31 are connected to the male conductor 18 of the male plug 11 using the novel connection means of a spring steel clamp 22 in place of the conventional screwed clamp means. In the same method, the single insulated wires 31 are connected to the female conductor 19 of the female socket 12 using the novel connection means of a spring steel clamp 22 in place of the conventional screwed clamp means.

Referring again to FIGS. 3 and 4, after connecting the single insulated wires 31 and securing the double insulated cables 40A,B in the locking balls 13A,B, the assembly is pressed into the locking ball recess 14 in the male plug housing 15 and female socket housing 16.

When assembling the male conductor assembly 20 into male plug housing 15, plug isolating blades 201, 202 and 203 contact locking ball 13A to assist the engagement of locking ball bump 39 into locking ball recess groove 38 and maintain locking ball 13A firmly engaged in locking ball recess 14 to provide an IP Rating seal between locking ball 13A and locking ball recess 14. Similarly, when assembling the female conductor assembly 21 into female socket housing 16, socket isolating blades 211, 212 and 213 contact locking ball 13B to assist the engagement of locking ball bump 39 into locking ball recess groove 38 and maintain locking ball 13B firmly engaged in locking ball recess 14 to provide an IP Rating seal between locking ball 13B and locking ball recess 14.

As seen in FIGS. 5 and 6, respective spring-loaded spring steel clamps 22 are retained on the male and female conductors 18 & 19 by interlocking through spring clamp slot 41 and anchor slot 42. The spring steel clamp 22 is depressed in the direction indicated to allow insertion of the bared single insulated wire 31 through a hole 23 and a half circle end profile 24 on the toe of the spring steel clamp 22 which then captures the single insulated wire 31 on release of the biased spring steel clamp 22 providing a secure and locked connection of single insulated wire 31 to the male conductor 18 and female conductor 19.

As shown in FIG. 9, the male plug conductor assembly 20 comprises male conductors 18 with spring steel clamp 22 contained and secured in mounting body 32 fitted into the male plug housing 15 and fastened in place by means of screw fasteners 30 as shown in FIGS. 3 and 4. Male conductors 18 are separated by isolating blades 201, 202 and 203 on conductor assembly 20 that also support and secure locking ball 13A in male plug housing 15. Similarly, the female conductor assembly 21 comprises female conductors 19 with spring steel clamp 22 contained and secured in two piece mounting body 33 fitted into the female socket housing 16 and fastened in place with screw fasteners 30. Female conductors 19 are separated by isolating blades 211, 212 and 213 on mounting body cover 35 that also support and secure locking ball 13B in female socket housing 16. The female socket 12 two piece mounting body 33 comprises mounting body base 34 and mounting body cover 35 that encloses and captures female conductors 19.

Mounting body base 34 includes stepped flange 214 with inner o-ring groove 215 and outer o-ring groove 216 both fitted with flexible o-rings to prevent water ingress. Stepped flange 214 engages shoulder 277 on retaining ring 27 to capture it on female socket housing 16.

It will be understood that the more common method of assembling the inner assembly of commonly used plugs and sockets to the outer housing is to force the inner assembly into a malleable outer housing where the housing and the inner assembly is prone to damage when being forcibly assembled or disassembled by a tradesman using pliers or such tools to complete this task. The screw fastener 30 means of securing the male conductor assembly 20 to the male plug housing 15 and female conductor assembly 21 to the female socket housing 16 is more convenient and avoids damage of any of the component parts during assembly or disassembly. The male plug 11 and female socket 12 of the connector 10 are designed to be fitted to existing power leads and extension leads by a qualified trades person to provide a safe and secure connector 10 for domestic, commercial or industrial applications.

Referring now to FIGS. 3, 4 and 7, another embodiment provides a locking mechanism to ensure the connection of the male plug 11 to the female socket 12 is maintained with a compressive fit to provide an Ingress Protection Rating (IP Rating). The connector 10 locking mechanism comprises three fixed flange segments 25 on the male plug 11 that interlock with the three corresponding flange segments 26 on retaining ring 27 that is rotatably captured on the female socket 12. The retaining ring 27 is initially in an open position on the female socket 12, to allow the three conductors 18 of the male plug 11 to engage with the three conductors 19 of the female socket 12. When the male conductors 18 and female conductors 19 are fully engaged, the retaining ring 27 is then rotated to engage the retaining ring 27 angled flange segments 26 over the complementary male plug 11 flange segments 25 whereby the angled flange segments 26 pull the male plug 11 and female socket 12 together as the retaining ring 27 is turned approximately 60 degrees to a closed position. The completed rotation provides a compressed engagement of the male plug 11 to the female socket 12 whereby the male plug 11 is fully engaged and locked firmly to the female socket 12 forming the connector 10 as described with the compressed engagement on the o-ring 28 captured in o-ring grooves 215 and 216 providing an IP Rating for the connector 10.

Referring to FIGS. 4 and 7, retaining ring 27 includes three lugs 271, 272 and 273 that engage with three guide slots 161, 162 and 163 on female socket housing 16 to limit the rotation of retaining ring 27 to sixty degrees from open to closed. Guide slots 161, 162, 163 also include gate bumps 164, 165, 166 to maintain lugs 271, 272, 273 in the open position. When retaining ring 27 is in the open position, female socket housing 16 guide slot bumps 167, 168 and 169 engage with retaining ring 27 indents 274, 275 and 276 to capture retaining ring 27 in the open position on female socket housing 16 and prevent retaining ring 27 from separating from female socket housing 16.

These features provide convenience when male plug 11 is disconnected from female socket 12, with the retaining ring 27 remaining attached to female socket housing 16, in the open position, ready to accept male plug 11 when reconnection is required. Capture of retaining ring 27 by guide slot bumps 167, 168 and 169 to female socket housing 16 when female conductor assembly 21 is disassembled, allows reassembly of female conductor assembly with stepped flange 214 on female socket housing 16 capturing shoulder 277 of the retaining ring 27.

The retainer ring 27 flange segments 26 may also include small engagement locking bumps (not shown) to provide secure engagement of the male plug 11 flange segments 25 to the female socket 12 flange segments 26 on the retaining ring 27 when reaching full engagement. As the opposing flange segments 25 & 26 reach full engagement, engagement locking bumps may be required to be overcome to complete the rotation and thereby secure the retaining ring 27 in the fully locked position. The full engagement of the flange segments 25 to flange segments 26 engages the male plug 11 and female socket 12 tightly together pressing O-ring 28 in groove 216 on mounting body base 34, against the face of the male plug housing 15 to provide the desired IP Rating. O-ring 28 may be a flexible O-ring or a formed O-ring bump on mounting body base 34.

The retainer ring 27 flange segments 26 may also include a flattening of the angled face (not shown) towards the end of each flange segment 26 to align with a similar flat on the male plug 11 flange segments 25 to provide a flat to flat engagement to enhance engagement of flange segments 25 to flange segments 26.

The retaining ring 27 is prevented from rotating more than the 60 degrees from open to closed to simplify operation by lugs 271, 272 and 273 engaging guide slots 161, 162 and 163. The external surface of the retaining ring 27 features raised surface segments or a roughened texture to provide grip for the operator when rotating the retaining ring 27 from an open position to a closed or locked position and vice versa.

Figure 10A:
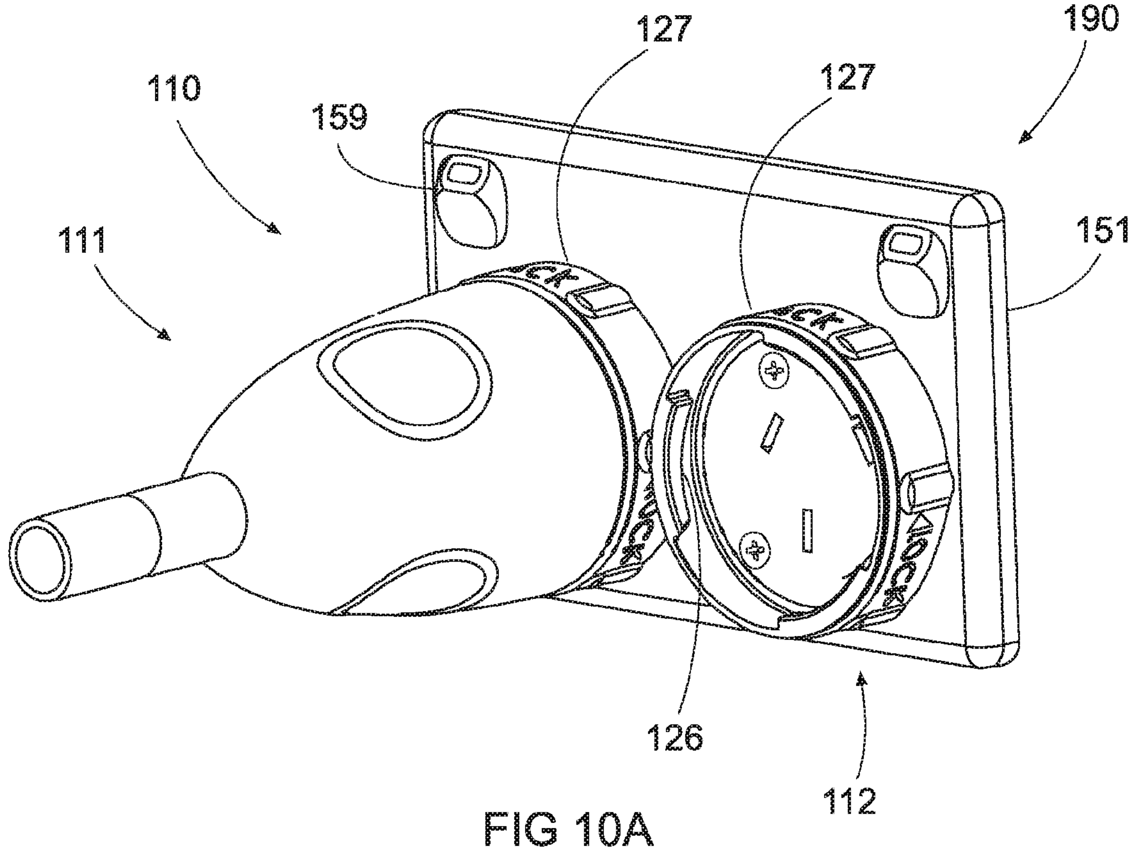
FIG. 10A is a front perspective view of a general purpose power outlet with a male plug and retaining ring having flange segments and with a female conductor with retaining ring.
Figure 10B:
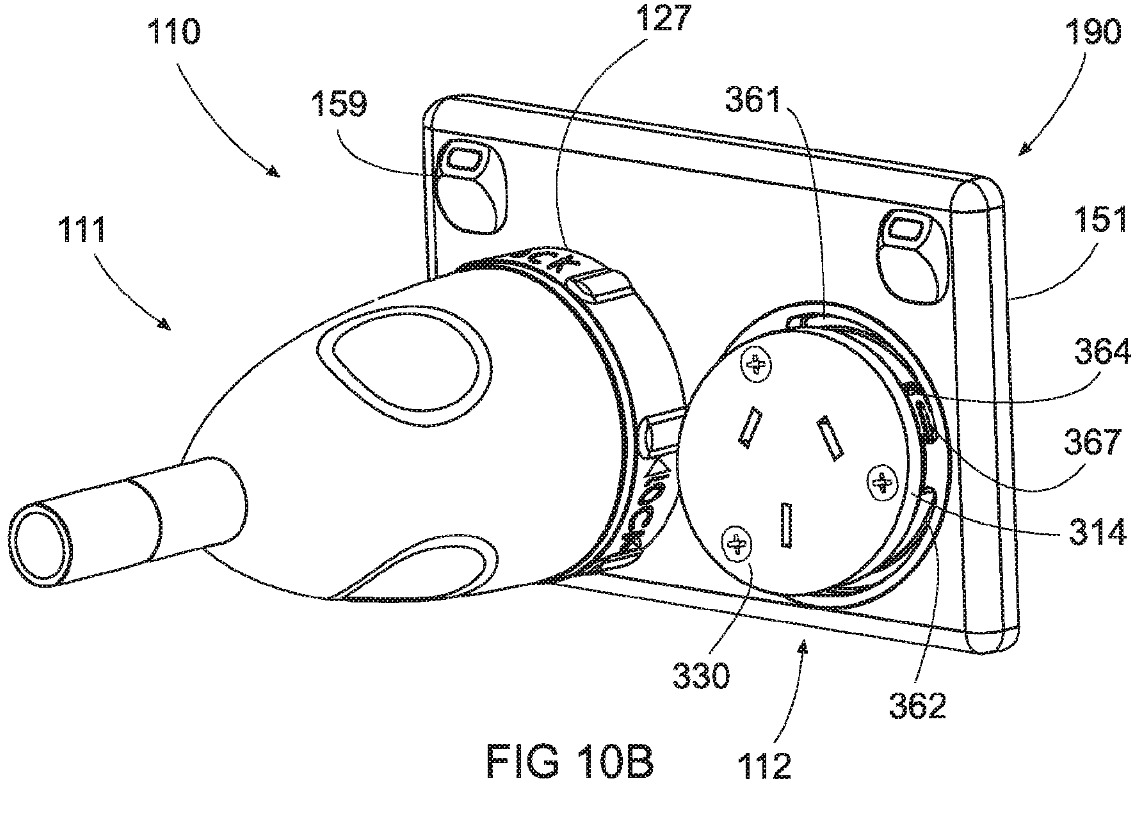
FIG. 10B is a front perspective view of a general purpose power outlet with a male plug and retaining ring having flange segments and with a female conductor assembly.
Figure 11A:
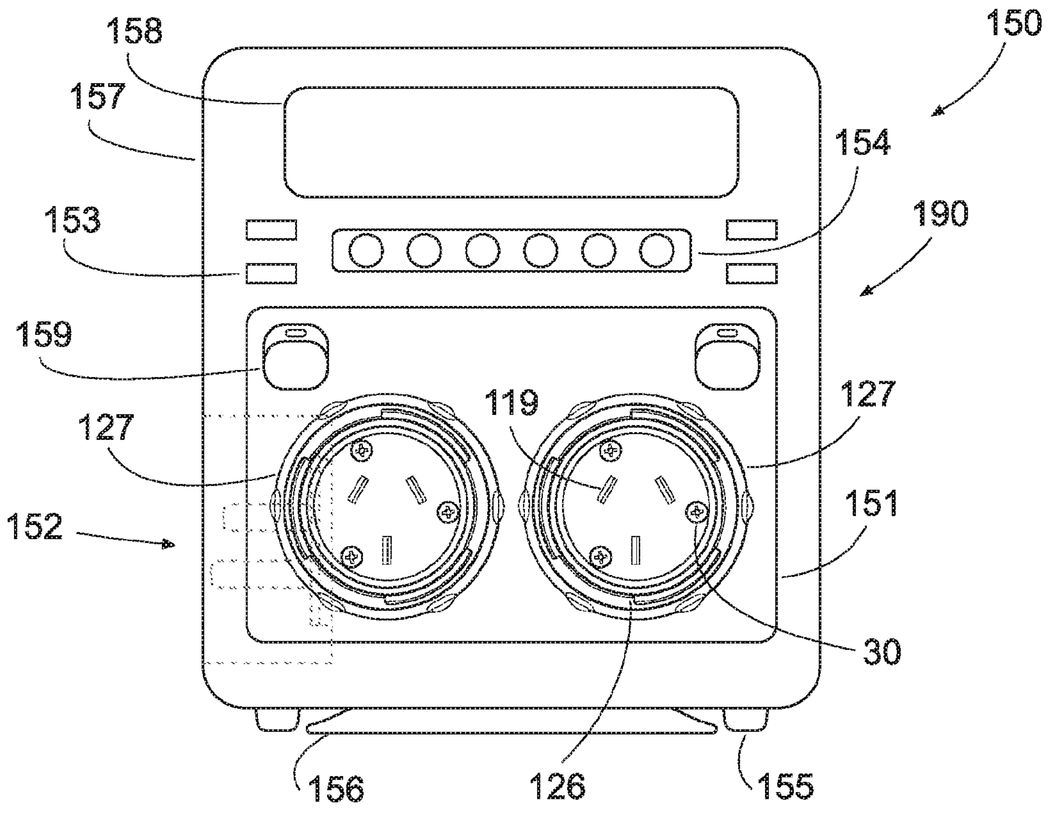
FIG. 11A is a front view of a multi outlet power pack with female conductors with retaining rings having flange segments.
Figure 11B:
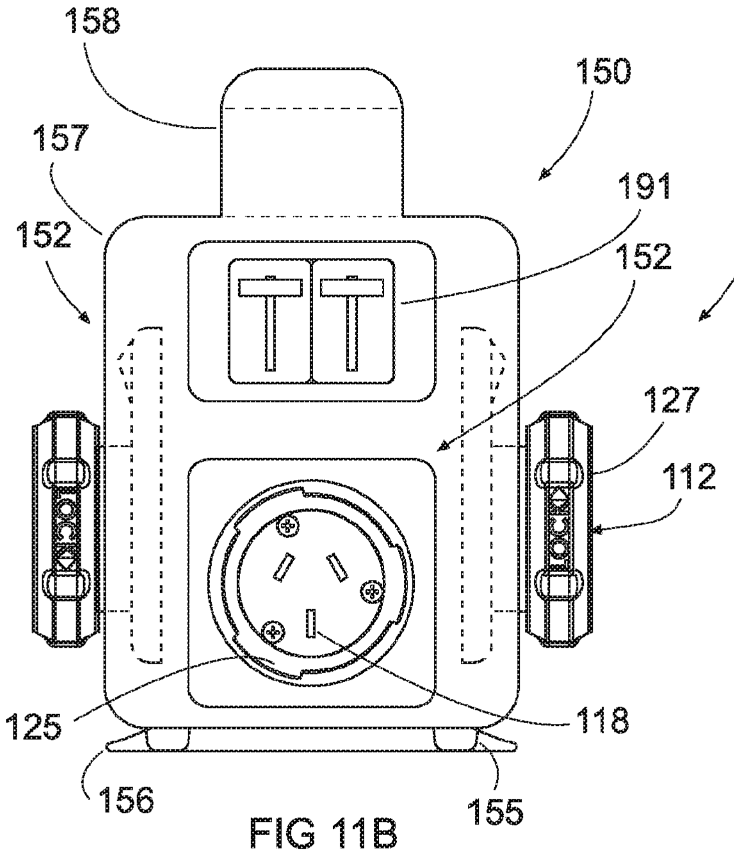
FIG. 11B is a side view of a multi outlet power pack with general purpose outlets with retaining rings and a power inlet having male conductors and flange segments.

As shown in FIGS. 10 and 11, another embodiment of the connector 110 is to provide a retaining ring 127 on a general purpose power outlet 190 including those used in a multi outlet power pack 150 commonly used on commercial sites such as construction sites where multiple power tools are being operated simultaneously from one power source. Power leads operating out of conventional multi outlet power packs are prone to uncoupling from the power pack outlet, disconnecting the power supply. With the retaining ring 127 provided as an integral part of the general purpose outlet 190 cover plate 151 on power pack 150, a power lead or extension lead with the male plug 111 of the connector 110 having flange segments 125 can engage the complementary flange segments 126 of the retaining ring 127 on the general purpose outlet 190 cover plate 151 of the power pack 150. The power pack 150 is provided with one or more USB sockets 153 to provide charging power to mobile phones and other such devices and features LED lights 154 to indicate power is connected and provide light in the workplace to improve safety on site. The power pack 150 is provided with rubber feet 155 or a rubber suction cup 156 to insulate, support and secure the power pack 150 to a floor or bench top as required. The housing 157 of the power pack is manufactured in a robust plastic material and a handle 158 is formed as part of the housing 158. The general purpose outlet 190 cover plate 151 features switches 159 to turn the power supply on and off. The power pack 150 is also provided with a safety switch 191 to shut off power in the case of an electrical fault or overload.

The retaining ring 127 when provided on standard wall mounted general purpose outlet 190 cover plates 151, will provide an improved and safe power connection that would be particularly beneficial in hospitals, restaurants, factories, offices and other situations where power leads and extension leads are used that include the male plug 111 of the invention. To further reduce the trip hazard of power leads coming from wall mounted general purpose outlets 190, the retaining ring 127 and female socket 112 may be set at an angle (not shown) to the cover plate 151 so the male plug 111 when connected, points towards the floor to direct the power lead or extension lead closer to the floor and reduce the trip hazard, providing a safer work place.

Figure 11C:
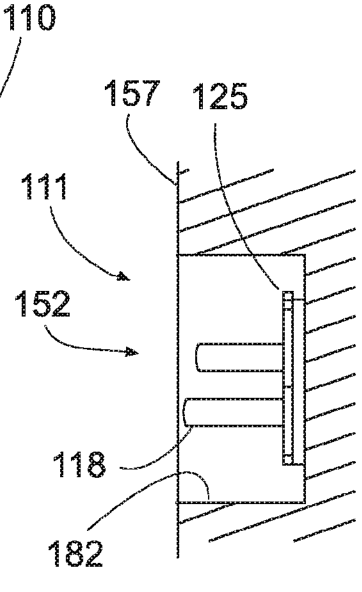
FIG. 11C is a sectional view of a power inlet having male conductors and flange segments.

With particular reference to FIG. 11C, another embodiment provides a multi outlet power pack 150 comprising a male plug 111 with flange segments 125 and male conductors 118 in a recessed housing 182 recessed in the side wall of power pack 150. A power inlet 152 is provided on the multi outlet power outlet 150 to connect to a power source (not shown) with a secure connection. This removes the need to have an integrated power supply cord on the multi outlet power pack 150. The power inlet 152 provides an improved and safe power connection for caravans or similar equipment such as food vendor vans, dog wash trailers etc. The power inlet 152 as described provides a secure connection when the retaining ring 127 of female socket 112 on an extension lead engages the flange segments 125 of the male plug 111 of the power inlet 152, preventing the extension lead from being accidentally removed or dislodged from the power inlet 152.

It will be appreciated that the invention and the particular embodiments disclosed herein provide a safe and secure electrical connector for power cords or extension leads and to provide an IP Rating for the electrical connector to prevent the electrocution of operators when the connection is exposed to water spray or rain. Connection of power cords in workplaces are often exposed to water, particularly on construction sites, so providing an electrical connector with an IP Rating improves the safety for the operator.

The male plug 11 and female socket 12 of the connector 10 are suited to being fitted to original equipment power tools and power appliances or extension cables by manufacturers of such items. The male plug 11 and female socket 12 of the connector 10 are also suited to being fitted by persons with electrical trades to assemble to existing power tools or extension leads. The described male plug 11 and female socket 12 of the connector 10 may be fitted as a replacement of unsafe or damaged plugs and sockets to provide an improved and safe connector 10 in place of the commonly used male plugs and female sockets that are slidably engaged with minimal safety features to protect operators.

It will also be appreciated that vehicles such as caravans and campervans typically rely on external power sources, such as where an extension lead is plugged into a power pole on-site (or a power outlet at a home) and then the female socket is plugged into the male plug mounted on the caravan normally behind a lid on the outside of the caravan. The power inlet 152 may be mounted at a downward angle on the caravan to point the extension lead towards the ground to limit the protrusion of the lead away from the caravan thereby reducing the trip hazard commonly encountered with caravan power supply extension leads. Certain embodiments of the invention address problems where the plug readily detaches due to a light bump or pull on the extension lead.

Certain embodiments of the invention address another particular problem and safety risk that occurs with pulling on snagged power cords and power cord extensions plug/socket connections which is the stretching of the outer double insulated cable that leads to the loosening of connection and potential exposure of the internal single insulated wires. Power tool leads, appliance leads and extension leads require regular inspection to identify unsafe cords where the internal single insulated wires are exposed from the cable end of an electrical plug or socket. This invention eliminates or at least minimizes the potential to expose the internal single insulated cable by using a locking ball within the electrical plug or socket to secure the outer double insulated cable within the electrical plug or socket and eliminate the opportunity of exposing the single insulated wires. In electrical leads with changeable plugs or sockets, under a pulling load, the outer double insulated cable can separate from the cable end of the electrical plug or socket. The pulling load can transfer to the wire connection with the conductor element within the plug or socket which can lead to the disconnection of power or create a hot connection, which is a major safety hazard. Preventing the exposure of the internal single insulated wires improves safety for the operator and ensures power cords will pass regular electrical lead inspection, saving the time and cost of removing faulty electrical plugs and sockets and replacing with new plugs and sockets.

It will also be appreciated that external shape of the male plug 11 and female socket 12 of the connector 10 when connected is provided with a smooth contour from a smaller diameter to the larger diameter with no hard shoulders, to prevent the connector 10 from snagging on obstacles while being used to provide power to a power tool or appliance. The smooth external shape of the connector 10 is particularly appropriate for tradesman on construction sites but is also applicable and desirable for industrial, commercial and domestic situations. The connector 10 is provided with a rubber or silicon bend protection grommet 29 fitted at the proximal end of the male plug housing 15 and female socket housing 16 to reduce the flexing of the double insulated cable 40 against the proximal ends of the male plug 11 and female socket 12 of the connector 10 to reduce potential damage to the double insulated cable.

It will also be appreciated that particular embodiments of this invention include an improved means to connect single insulated wires to the electrical plug conductors. The common method is to wrap the bared copper wire around the shank of a screw which is then tightened to lock the wire to the conductor element. The common issue with the existing screw connection is that the copper wire is not fully engaged under the screw head and the tension on the screw is insufficient to ensure a permanent connection. An insecure connection can create safety problems and the risk of starting a fire and can lead to an interruption of the power supply when a load is applied to the outer double insulated cable causing the inner single insulated wire to separate from the screwed terminal connection. This invention utilizes a spring steel clamp to provide a simple and safe connection of the single insulation wires. With the locking ball securing the outer double insulated cable, the connection of the single insulated wires will no longer be subjected to a pulling load so a spring steel clamp is able to be used to connect the single insulated wires. The spring steel clamp is a safe and secure means of connecting single insulation wires that has not been used as a connection means in the commonly used male plug and female socket application. Spring steel clamps are used in many electrical connections and are included in this invention as an improved means of electrical connection within a male plug and female socket.

A further feature of this invention is to achieve an Ingress Protection Rating (IP Rating) for the male plug and female socket of the connector. An IP Rating for the male plug and female socket of the connector will prevent intrusion from dust and from water splashing against the enclosure from any direction thereby improving safety for the operator. A snug fit of components with the provision of a sealing ring, such as a commercially available O-ring or the inclusion of an O-ring shape on one or more faces of any ingress sealing sections of the male plug or female socket, will provide the desired IP Rating.

Throughout the specification the aim has been to describe the preferred embodiments of the invention without limiting the invention to any one embodiment or specific collection of features. It will therefore be appreciated by those of skill in the art that, in light of the instant disclosure, various modifications and changes can be made in the particular embodiments exemplified without departing from the scope of the present invention.

All computer programs, algorithms, patent and scientific literature referred to herein is incorporated herein by reference.

The invention claimed is:

1. An electrical connector comprising a plug connector and a socket connector that are connectable to respective electrical conduits, wherein the plug connector comprises a housing having an internal recess and a locking ball locatable inside the electrical connector for engaging the internal recess and the conduit to thereby secure one of the electrical conduits to the electrical connector and the socket connector comprises a housing having an internal recess and a locking ball locatable inside the housing for engaging the internal recess and the conduit to thereby secure another of the electrical conduits to the electrical connector, wherein the plug connector and the socket connector are connectable to each other to thereby form an electrical connection between the plug connector and the socket connector, wherein: the locking ball of the plug connector can engage the housing and the electrical conduit to secure or at least partly prevent or minimize rotational and/or longitudinal movement of the electrical conduit relative to the plug connector; the locking ball of the socket connector can engage the housing and the electrical conduit to secure or at least partly prevent or minimize rotational and/or longitudinal movement of the electrical conduit relative to the socket connector; and each locking ball comprises a respective body having two or more portions that are moveable between an open configuration and a closed, clamping configuration and wherein the socket connector further comprises a locking mechanism that can releasably lock the socket connector to a complementary locking member of the plug connector, wherein the locking mechanism comprise a rotatable retaining ring and one or more flange elements mounted to the retaining ring that can rotatably engage one or more complementary flange elements of the plug connector.

* * * * *